(12) United States Patent
Chen et al.

(10) Patent No.: US 9,161,178 B2
(45) Date of Patent: Oct. 13, 2015

(54) MULTI-GROUP COMMUNICATIONS AND RELATED DEVICES

(76) Inventors: Liang Chen, Chengdu (CN); Xiao-Yu Li, Chengdu (CN); Jason Xu, Chengdu (CN)

( * ) Notice: Subject to any disclaimer, the term of this patent is extended or adjusted under 35 U.S.C. 154(b) by 125 days.

(21) Appl. No.: 14/009,008

(22) PCT Filed: Mar. 30, 2011

(86) PCT No.: PCT/CN2011/072282
§ 371 (c)(1),
(2), (4) Date: Mar. 18, 2014

(87) PCT Pub. No.: WO2012/129784
PCT Pub. Date: Oct. 4, 2012

(65) Prior Publication Data
US 2014/0204824 A1    Jul. 24, 2014

(51) Int. Cl.
*H04W 4/00* (2009.01)
*H04W 4/06* (2009.01)
*H04W 4/08* (2009.01)

(52) U.S. Cl.
CPC . *H04W 4/06* (2013.01); *H04W 4/08* (2013.01)

(58) Field of Classification Search
None
See application file for complete search history.

(56) References Cited

U.S. PATENT DOCUMENTS

| | | | | |
|---|---|---|---|---|
| 5,274,837 A | * | 12/1993 | Childress et al. | 455/7 |
| 2005/0073964 A1 | * | 4/2005 | Schmidt et al. | 370/260 |

FOREIGN PATENT DOCUMENTS

| | | |
|---|---|---|
| CN | 101030937 A | 9/2007 |
| KR | 100625666 B1 | 9/2006 |
| WO | 2009136744 A2 | 11/2009 |

* cited by examiner

*Primary Examiner* — Frank Duong
(74) *Attorney, Agent, or Firm* — Barbara R. Doutre

(57) ABSTRACT

Methods and apparatus are provided for communicating a message to multiple radio groups (102, 104). An exemplary method (300) involves configuring, by an initiating radio device (120), a header portion of a message (308) for a multi-group communication session including the plurality of radio groups (102, 104) and transmitting the message (310). Each respective radio device (110) of each respective radio group (102, 104) is configured to provide output (408) corresponding to a content portion of the message in response to identifying its own radio group (406) in the header portion of the message (404).

17 Claims, 4 Drawing Sheets

US 9,161,178 B2

MULTI-GROUP COMMUNICATIONS AND RELATED DEVICES

TECHNICAL FIELD

Embodiments of the subject matter described herein relate generally to communications systems, and more particularly, embodiments of the subject matter relate to communicating messages to multiple groups of radio devices.

BACKGROUND

Mobile radio systems are useful for providing reliable communications for many different types of applications, such as, military, public safety (e.g., police, fire, emergency medical technicians, and the like), or within other organizations or businesses with dispatch requirements (e.g., taxis, utilities, trucking, and the like). Often, individual radios (or subscriber units) are organized or otherwise assigned to a group for purposes of group calling, where a message from one radio in the group is broadcast and received by other radios in the group.

In some situations, a user may desire to have his or her message provided to users of radios assigned to multiple different groups. For example, in an emergency, a police officer may desire to communicate with other public safety personnel (e.g., firefighters and/or emergency medical technicians) in addition to the other members of the police department. To support a group call among multiple different radio groups, existing systems typically require either a centralized controller or a special messaging protocol to establish a temporary group by reprogramming the individual radios. Additionally, over-the-air interference or being outside of the broadcast range during the setup procedure may result in some radios being left out of the temporary group, and as a result, one or more users may miss hearing the message.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Embodiments of the subject matter described herein generally relate to establishing multi-group communication sessions (or multi-group group calls) between radio devices of different radio groups. As described in greater detail below, a user of an initiating radio device selects or otherwise indicates the desired radio groups for participation in the multi-group communication session before providing the audio content to be provided to the users in the selected radio groups. The initiating radio device configures a message header that is transmitted before the audio content to identify the transmitted message as a multi-group message, and also configures the message header to identify the radio groups selected for inclusion in the multi-group communication session. Each radio device in a selected (or targeted) radio group receives the transmitted message and analyzes the message header to determine whether its own group is one of the radio groups selected for inclusion in the multi-group communication session, and in response to identifying its own radio group in the message header, provides the audio content to its user. As described in greater detail below, the configuration information for the multi-group communication session is also interspersed or otherwise embedded at periodic intervals within the body of the multi-group message, thereby allowing users of radio devices in the targeted radio groups to receive at least a portion of the multi-group message even if the message header is not received (e.g., due to over-the-air interference, the radio device being out of range, or the radio device being powered off). Additionally, in an exemplary embodiment, each radio device in a targeted radio group stores the configuration information in the message header to enable responses within the multi-group communication session.

Figure 1:
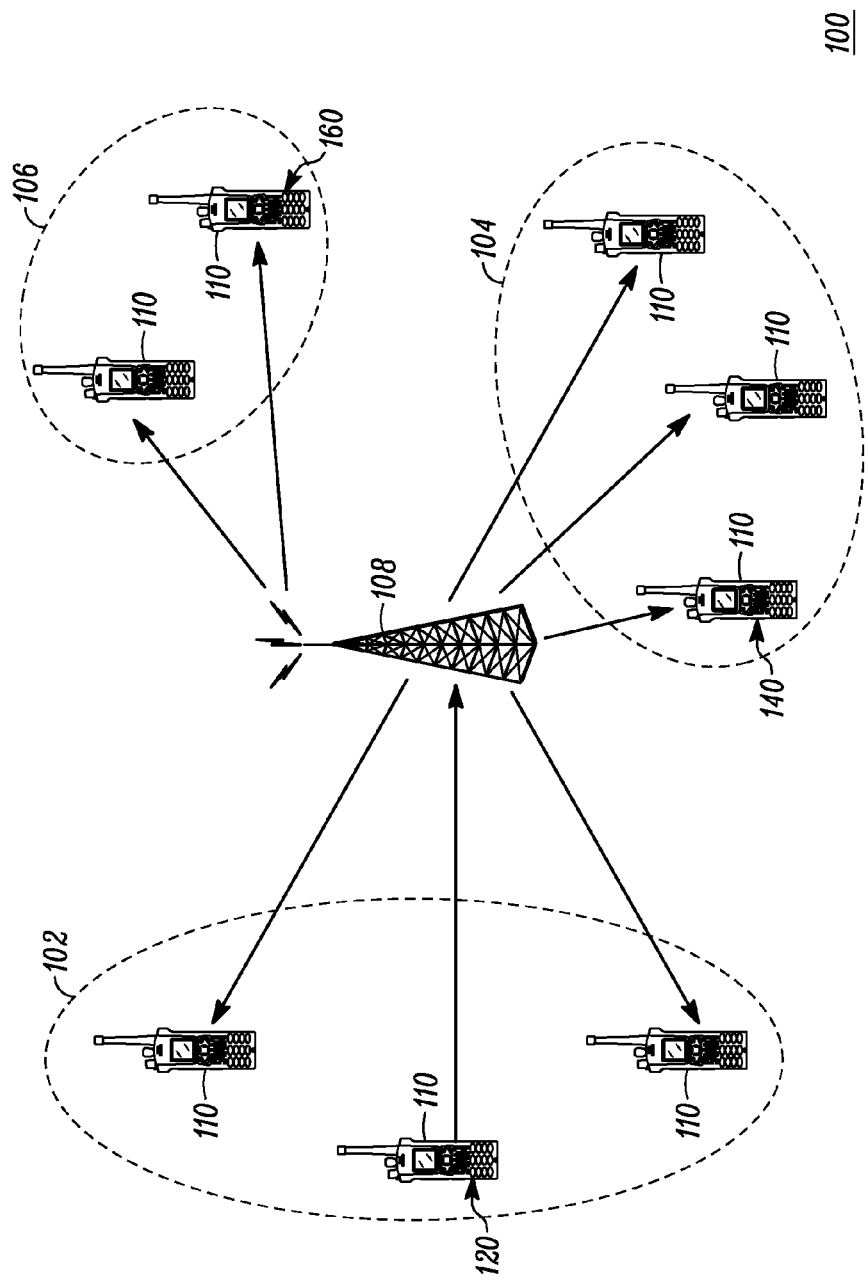
FIG. 1 is a schematic representation of an exemplary communications system in accordance with one embodiment.

Referring now to FIG. 1, in an exemplary embodiment, a communications system 100 includes, without limitation, a plurality of radio devices 110 organized into a plurality of different radio groups 102, 104, 106 and one or more repeaters 108. Each radio group 102, 104, 106 includes a plurality of individual radio devices 110 (or subscriber units) that are assigned to or otherwise associated with the respective radio group 102, 104, 106. As described in greater detail below, the radio devices 110 are configured to support multi-group communication sessions where a multi-group message is capable of being provided to users of radio devices 110 of different radio groups 102, 104, 106 concurrently.

As illustrated in FIG. 1, each radio device 110 is assigned to or otherwise associated with a particular radio group 102, 104, 106. In this regard, each radio device 110 associated with a first type (or class) of users may be programmed with a common group identifier (or group ID) to enable group calls among other radio devices 110 having the same group identifier, thereby establishing the first radio group 102. For example, a first radio device 120 associated with or otherwise operated by a police officer may be programmed with a group identifier (or group ID) for a radio group 102 utilized by the police department. In a similar manner, a second set of radio devices 110 associated with second type (or class) of users (e.g., firefighters) may be programmed with a different group identifier corresponding to a second radio group 104 to enable group calls among the radio devices 110 assigned to that radio group 104, and another set of radio devices 110 associated with third type (or class) of users (e.g., emergency medical technicians) may be programmed with another group identifier corresponding to a third radio group 106 to enable group calls among the radio devices 110 assigned to the third radio group 106. In this regard, each radio group 102, 104, 106 may be associated with a different organization or governmental entity and operate or otherwise communicate amongst each other independently during normal operation using regular group call. Thus, each radio group 102, 104, 106 may be made up of a different class of users relative to the other radio groups, and each radio group 102, 104, 106 may correspond to a respective entity or organization that operates the respective radio group independently of the other radio groups.

In accordance with one or more embodiments, the communications system 100 is implemented in accordance with the digital mobile radio (DMR) standard, which provides for the use of group IDs for regular single group calls that have a length of 24 bits. In such embodiments, each radio device 110 of the police department radio group 102 is programmed with a first 24-bit group ID corresponding to the police department radio group 102, each radio device 110 of the fire department radio group 104 is programmed with a second 24-bit group ID corresponding to the fire department radio group 104, and each radio device 110 of the medical radio group 106 is programmed with a third 24-bit group ID corresponding to the medical radio group 106. In this manner, each radio device 110 knows which radio group 102, 104, 106 within the communications system 100 that it is associated with or otherwise assigned to.

As described in greater detail below in the context of FIG. 3, in an exemplary embodiment, the radio devices 110 are configured to support multi-group communication sessions, such that a user of an initiating radio device 120 in the first radio group 102 may transmit or otherwise broadcast a message that is concurrently provided to users of radio devices 110 in the same radio group 102 as the initiating radio device 120 as well as users of radio devices 110 in other targeted radio groups 104, 106 that the initiating radio device 120 is not associated with. In other words, the audio content of the message is reproduced or otherwise provided to users of radio devices 110 in the same radio group 102 as the initiating radio device 120 while at the same time being provided to users of radio devices 110 in other targeted radio groups 104, 106.

As described in greater detail below, in accordance with one or more embodiments, in addition to being programmed with a group identifier for group calls among its own associated radio group, each radio device 110 is programmed with one or more additional group identifiers for multi-group communications. In such embodiments, the group identifiers for multi-group communications are shorter in length than the group identifiers for single group communications to allow the multi-group messages to be formatted with a message header and/or target group field having the same length as the message header and/or target group field used with regular group call messages. For example, when the communications system 100 is implemented in accordance with the DMR standard, each radio device 110 is programmed with one or more own group IDs for multi-group communications that are a fraction (or ratio) of the length of the 24-bit group ID to support multi-group communications among a particular number of radio groups. For example, each radio device 110 of the police department radio group 102 may be programmed with a 12-bit group ID (e.g., to support multi-group communications among 2 radio groups), a 8-bit group ID (e.g., to support multi-group communications among 3 radio groups), a 6-bit group ID (e.g., to support multi-group communications among 4 radio groups), and/or a 4-bit group ID (e.g., to support multi-group communications among 6 radio groups), and so on, depending on the needs of a particular embodiment. Similarly, each radio device 110 of the fire department radio group 104 may be programmed with one or more fractional bit length group IDs corresponding to the fire department group 104, and each radio device 110 of the medical radio group 106 may be programmed with one or more fractional bit length group IDs corresponding to the medical group 106. Additionally, as described in greater detail below in the context of FIGS. 2-3, each radio device 110 also stores or otherwise maintains the group IDs for the other radio groups 102, 104, 106 of the communications system 100 to support multi-group communications.

In accordance with one or more alternate embodiments, rather than each radio device 110 being programmed with additional group identifiers for multi-group communications, each radio device 110 may determine its multi-group identifier by truncating a portion of its regular group identifier based on the number of groups selected for the multi-group communication session. For example, when the communications system 100 is implemented in accordance with the DMR standard, for multi-group communications among 2 radio groups, each radio device 110 may truncate 12-bits of its regular group call ID (e.g., the first 12 bits, the last 12 bits, the first 6 bits and the last 6 bits, or the like) to obtain a 12-bit group ID based on there being 2 targeted radio groups. For multi-group communications among 3 radio groups, each radio device 110 may truncate 16-bits of its regular group call ID (e.g., the first 16 bits, the last 16 bits, the first 8 bits and the last 8 bits, or the like) to obtain a 8-bit group ID based on there being 3 targeted radio groups, and so on. In an exemplary embodiment, the manner in which the group identifiers are truncated is chosen to ensure that unique multi-group IDs for each radio group 102, 104, 106 of the communications system 100 for the number of targeted radio groups, and the manner in which the group identifiers are truncated will vary depending on the needs of a particular embodiment.

Still referring to FIG. 1, in the illustrated embodiment, each radio device 110 is realized as a mobile two-way radio configured for half-duplex communications between other radio devices 110 of its respective group via the repeater 108. In this regard, each radio device 110 transmits or otherwise broadcasts messages at a transmit frequency and receives messages at a receive frequency that is different from the transmit frequency, wherein the repeater 108 is configured to receive messages at the transmit frequency and rebroadcast or otherwise retransmit the messages at the receive frequency. It should be understood that FIG. 1 is a simplified representation of a communications system 100 for purposes of explanation, and FIG. 1 is not intended to limit the subject manner in any way. For example, the topology and configuration of the communications system 100 can vary to suit the needs of the particular application, and the subject matter described herein may be implemented in an equivalent manner in other communications systems (e.g., direct mode communications systems without using repeater 108, trunked communications systems, or the like) and/or with full-duplex radio devices.

Figure 2:
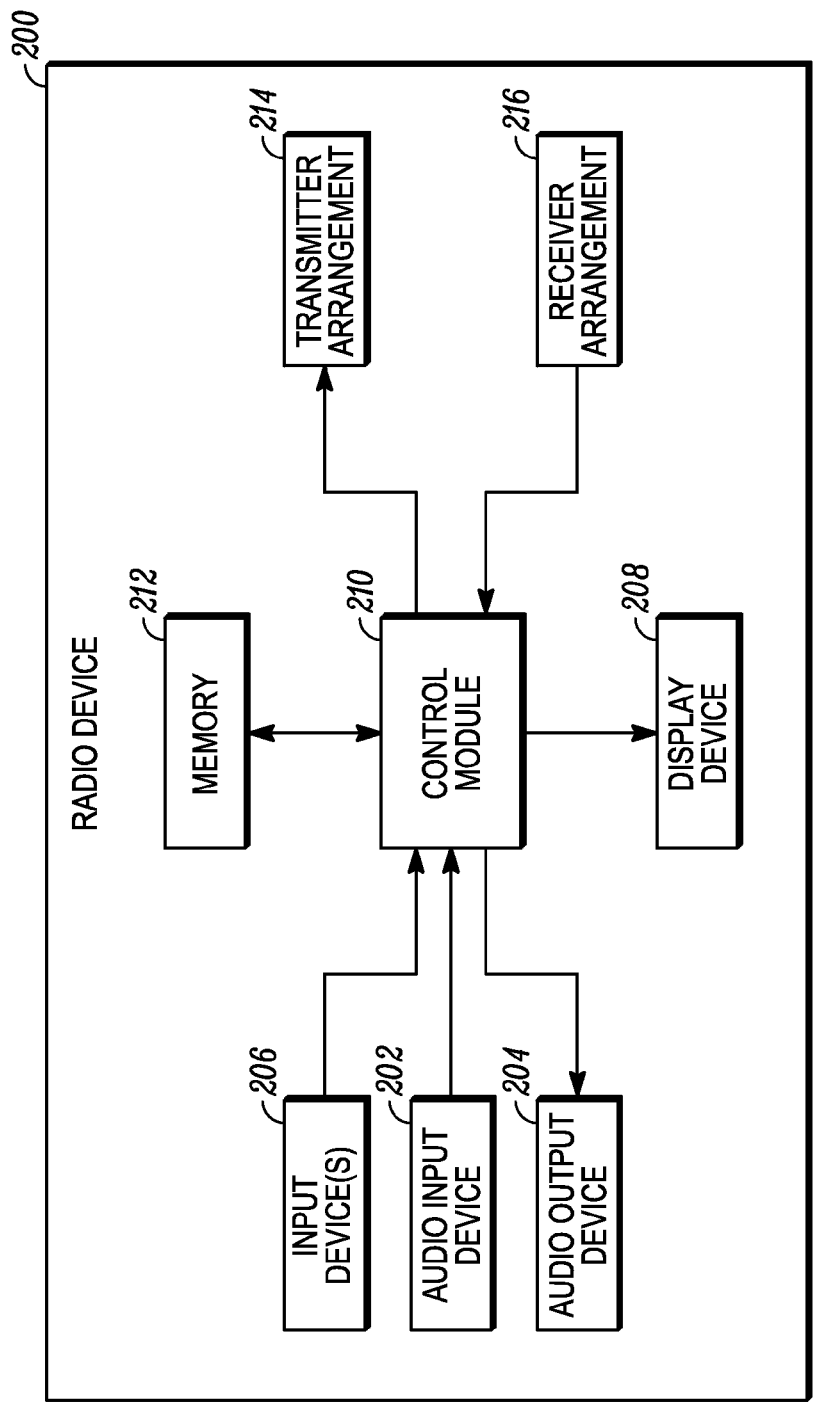
FIG. 2 is a block diagram of an exemplary radio device suitable for use in the communications system shown in FIG. 1 in accordance with one embodiment.

Turning now to FIG. 2, an exemplary radio device 200 suitable for use in the communications system 100 of FIG. 1 (e.g., as radio devices 110) includes, without limitation, an audio input device 202, an audio output device 204, one or more additional input devices 206, a display device 208, a control module 210, a memory 212, a transmitter arrangement 214, and a receiver arrangement 216. It should be appreciated that FIG. 2 depicts the radio device 200 in a simplified manner for purposes of explanation and ease of description, and that a practical embodiment may include additional components suitably configured to support known or conventional operating features that are not described in detail herein.

In an exemplary embodiment, the audio input device 202 is coupled to the control module 210, and the audio input device 202 realized as a microphone or another device configured to produce or otherwise generate an electrical signal in response to an auditory input provided by a user. The audio output device 204 is also coupled to the control module 210 and realized as a speaker or another device configured to produce or otherwise generate auditory output in response to electrical signals from the control module 210. The input device(s) 206 generally represent the other physical user interface device(s) of the radio device 200, such as, for example, buttons, knobs, keypads, keyboards, joysticks, touch panels, touchscreens, or the like, which are coupled to the control module 210 to support multi-group communications using the radio device 200, as set forth below. The display device 208 is realized as an electronic display that is coupled to the control module 210 and configured to graphically display information and/or content under control of the control module 210. Depending on the embodiment, the display device 208 may be realized as a liquid crystal display (LCD), a light emitting diode (LED) display, or another suitable electronic display.

The transmitter arrangement 214 is coupled to the control module 210 and generally represents the hardware and/or other components of the radio device 200 configured to facilitate transmitting or otherwise broadcasting messages over-the-air for receipt by other radio devices in a communications system. The transmitter arrangement 214 may include a combination of components, such as, digital to analog converters (DACs), digital signal processing elements, multiplexers, mixers, filters, power amplifiers, antennas, and the like, which are suitably configured to generate analog radio frequency (RF) signals that are representative of messages and/or other information received from the control module 210, as will be appreciated in the art. As described above, in the half-duplex radio system 100 of FIG. 1, the transmitter arrangement 214 generates RF signals at the transmit frequency which are received by the repeater 108 and subsequently rebroadcast at the receive frequency. The receiver arrangement 216 is coupled to the control module 210 and generally represents the hardware and/or other components of the radio device 200 configured to convert received RF signals at the receive frequency to baseband signals that are representative of messages transmitted by other radio devices in the communications system, wherein the baseband signals are received, decoded, and/or processed by the control module 210 to enable the audio content of the messages to be reproduced via audio output device 204, as described in greater detail below. In this regard, the receiver arrangement 216 includes a combination of components, such as, analog-to-digital converters (ADCs), digital signal processing elements, multiplexers, mixers, filters, power amplifiers, antennas, and the like, which are suitably configured to demodulate and/or deconstruct an analog RF signal at the receive frequency into a digital representation for processing at the control module 210, as will be appreciated in the art.

In the illustrated embodiment, the control module 210 generally represents processing logic, circuitry, hardware, and/or firmware components of the radio device 200 configured to support communicating multi-group messages, and perform additional tasks and/or functions described in greater detail below. Depending on the embodiment, the control module 210 may be implemented or realized with a general purpose processor, a microprocessor, a controller, a microcontroller, a content addressable memory, a digital signal processor, an application specific integrated circuit, a field programmable gate array, any suitable programmable logic device, discrete gate or transistor logic, discrete hardware components, or any combination thereof, designed to perform the functions described herein. The memory 212 represents any non-transitory short or long term storage media capable of storing programming instructions for execution by the control module 210, including any sort of random access memory (RAM), read only memory (ROM), flash memory, registers, hard disks, removable disks, magnetic or optical mass storage, and/or the like. The programming instructions, when read and executed by the control module 210, cause the control module 210 to perform certain tasks, operations, functions, and processes described in more detail herein. Alternatively or additionally, the control module 210 could cooperate with computer-readable media (not separately shown) that is realized as a portable or mobile component or platform, e.g., a portable hard drive, a USB flash drive, an optical disc, or the like, to receive computer-executable instructions configured to cause the control module 210 to perform the tasks, operations, functions, and processes described herein.

As described in greater detail below, in an exemplary embodiment, the memory 212 also stores or otherwise maintains the group identifiers for the radio group that the radio device 200 is associated with or otherwise assigned to, in addition to the group identifiers for the other radio groups in the communications system. For example, referring to FIG. 1, the memory 212 of a radio device 120, 200 in the police department radio group 102 maintains the group identifiers (e.g., the 24-bit group ID, the 12-bit group ID, the 8-bit group ID, and/or the 6-bit group ID, and so on) for the police department radio group 102, and also maintains the group identifiers for the other radio groups 104, 106 in the communications system 100.

Figure 3:
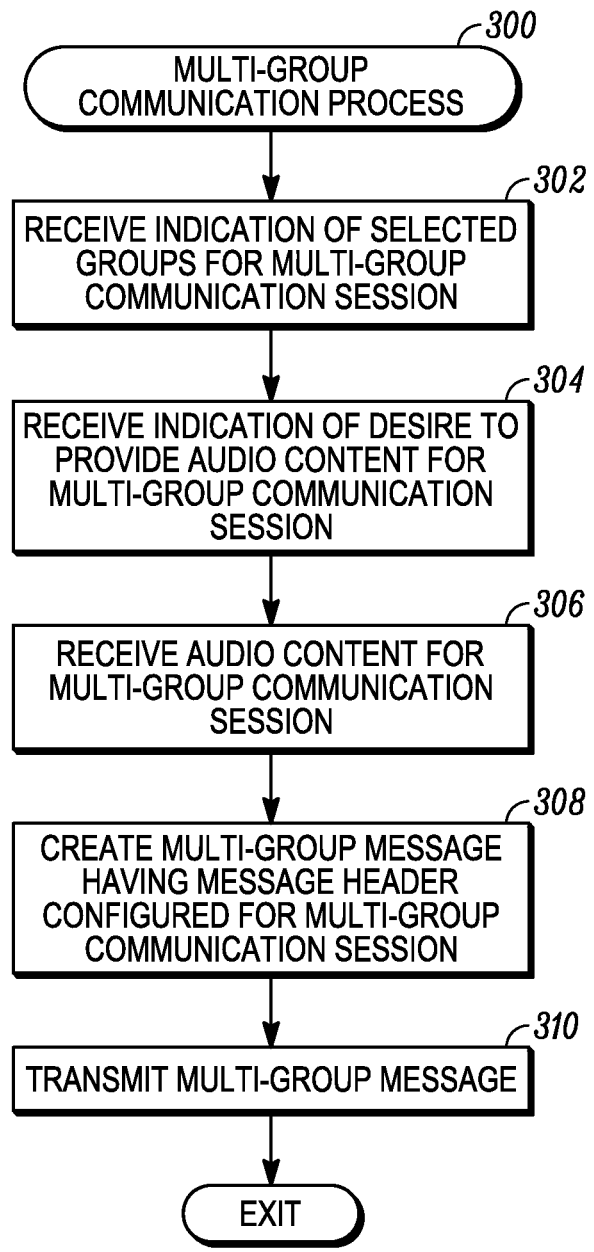
FIG. 3 is a flow diagram of a multi-group communication process suitable for use with the communications system of FIG. 1 in accordance with one embodiment.

Referring now to FIG. 3, in an exemplary embodiment, a radio device in a communications system is configured to perform a multi-group communication process 300 and additional tasks, functions, and operations described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the radio devices 110, 200, the control module 210, the audio input device 202, the input device(s) 206, the display device 208, and/or the transmitter arrangement 214. It should be appreciated that the multi-group communication process 300 may include any number of additional or alternative tasks, the tasks need not be performed in the illustrated order and/or the tasks may be performed concurrently, and/or the multi-group communication process 300 may be incorporated into a more comprehensive procedure or process having additional functionality not described in detail herein. Moreover, one or more of the tasks shown and described in the context of FIG. 3 could be omitted from an embodiment of the respective process as long as the intended overall functionality remains intact.

Referring to FIG. 3, and with continued reference to FIG. 1 and FIG. 2, in an exemplary embodiment, the multi-group communication process 300 begins in response to a user indicating a desire to initiate a multi-group communication session (or multi-group group call). For example, a user of a radio device 120, 200 in the first radio group 102 may manipulate an input device 206 on the radio device 120, 200 (e.g., a button dedicated to the multi-group communication process 300) to initiate the multi-group communication process 300. After the multi-group communication process 300 is initiated, the multi-group communication process 300 begins by receiving indication of the selected (or desired) radio groups for participation in the multi-group communication session (task 302). For example, after the multi-group communication process 300 is initiated, the control module 210 may present, on the display device 208 of the initiating radio device 120, 200, a list of the different radio groups 102, 104, 106 within the communications system 100. In this regard, FIG. 1 depicts a multi-group communication session when the initiating radio device 120 has selected or otherwise targeted all three radio groups 102, 104, 106 for participation or in the multi-group communication session. In this regard, the user of the initiating radio device 120, 200 may manipulate an input device 206 to select, from the list, each of the radio groups 102, 104, 106 or otherwise indicate a desire to include radio groups 102, 104, 106 for participation in the multi-group communication session. It should be noted that in some embodiments, the own radio group of the initiating radio device 120 (e.g., radio group 102) may be selected by default, and in such embodiments, the list of the different radio groups within the communications system 100 need not include radio group 102 and/or a user of the initiating radio device 120 need not affirmatively select radio group 102. The radio groups selected for participation in the multi-group communication session may alternatively be referred to herein as the target radio groups (or targeted radio groups) for a multi-group message transmitted by the initiating radio device.

After receiving indication of the target radio groups selected for the multi-group communication session, the multi-group communication process 300 continues by receiving indication of a desire to provide audio content for the multi-group communication session (task 304). In this regard, after selecting the desired target radio groups for inclusion in the multi-group communication session, the user of the initiating radio device 120, 200 may manipulate an input device 206 to indicate the user is ready to begin providing audio content (or voice content) for the multi-group message to be transmitted by the initiating radio device in the multi-group communication session (e.g., push-to-talk). For example, after selecting the radio groups 102, 104, 106 as target radio groups for inclusion in the multi-group communication session, the user of the initiating radio device 120, 200 may manipulate or otherwise activate a button before providing audio content for the multi-group communication session. In some embodiments, manipulating an input device 206 to indicate as desire to begin providing audio content may also function as a confirmation or indication that the user is satisfied with the selected target radio groups for the multi-group communication session. In response to receiving indication of a desire to provide audio content for the multi-group communication session, the control module 210 may provide feedback to the user (e.g., an auditory cue via audio output device 204) to indicate the radio device 200 is ready for the audio content in a conventional manner.

In an exemplary embodiment, the multi-group communication process 300 continues by receiving audio content for the multi-group communication session, creating a multi-group message for a multi-group communication session with the selected target radio groups, and transmitting the multi-group message over-the-air (tasks 306, 308, 310). As used herein, a multi-group message should be understood as referring to a message that includes a header portion (or message header) and an appended content portion (e.g., audio frames) following the header portion, wherein the header portion identifies the message type as a multi-group message and also identifies the target radio groups for the multi-group message. As described in greater detail below, identifying the message type as a multi-group message influences the manner in which other radio devices decode or otherwise process the target radio group portion of the message header. Additionally, in some embodiments, the header portion of the multi-group message may identify the number of target radio groups for the multi-group message or otherwise indicate the manner in which the target radio group portion of the message header should be decoded. For example, referring again to FIGS. 1-2, the DMR standard provides for a message header that includes one or more control fields for influencing the manner in which a received message is decoded or otherwise handled, such as, for example, a 6-bit field for a link control operator (or link control opcode) and an 8-bit field for a manufacturer identifier code. The control module 210 of the initiating radio device 120, 200 may configure or otherwise format the link control opcode and/or the manufacturer identifier field of the multi-group message with a unique code to identify the message type as a multi-group message. The code provided in the link control field and/or manufacturer identifier field may also identify the number of target radio groups for the multi-group message. Additionally, the message header provided under the DMR standard includes a 24-bit field for a target group identifier, wherein the control module 210 formats the target group identifier to identify the target radio groups for the multi-group message. In this regard, the control module 210 of the initiating radio device 120, 200 partitions the 24-bit target group identifier field into a number of portions corresponding to the number of target radio groups selected for the multi-group communication session, and utilizes the multi-group group IDs having a length equal to the size of the partitions of the target group identifier field, as set forth below. It should be noted that in some embodiments, to accommodate a greater number of target radio groups, the control module 210 may also partition and utilize the source identifier field into a number of portions and thereby increase the number of bits that may be used to identify target radio groups. For example, if 8-bit group identifiers are the minimum length that ensure radio groups have unique group IDs, then one or more 8-bit partitions may be formed in the source identifier field and used for targeting more than three radio groups.

Referring now to FIGS. 1-3, in an exemplary embodiment using the DMR standard discussed above, when the user of the initiating radio device 120, 200 selects three target radio groups 102, 104, 106, the control module 210 of the initiating radio device 120, 200 configures, modifies, or otherwise formats the link control field and/or the manufacturer identifier field of the message header for the multi-group message to identify the message type as a multi-group message. In some embodiments, the control module 210 of the initiating radio device 120, 200 may also configure the link control field and/or the manufacturer identifier field of the message header to identify the number of target radio groups for the multi-group message. The control module 210 of the initiating radio device 120, 200 also partitions the 24-bit target group identifier field into three 8-bit portions (e.g., by dividing the length of the target group identifier field by the number of target radio groups), obtaining, from memory 212, the 8-bit group IDs corresponding to the target radio groups 102, 104, 106, and concatenating the 8-bit group IDs to obtain a 24-bit target group identifier field for the multi-group message. As described above, in alternative embodiments, the control module 210 may obtain the 8-bit group IDs for the target radio groups 102, 104, 106 by obtaining their respective 24-bit group IDs from memory 212 and truncating 16-bits of each respective 24-bit group ID before concatenating them. It should also be noted that in other embodiments, instead of dynamically determining how to partition the target group identifier field, the target group identifier field partitions may be fixed (e.g., by a system administrator), with the number of possible target radio groups capable of being supported by the communications system limited in a corresponding manner (e.g., if the target group identifier field is fixed at 8-bits for multi-group calls, then the user may only be allowed to select two radio groups in addition to the user's own radio group for a maximum of three targeted radio groups).

The control module 210 of the initiating radio device 120, 200 receives electrical signals representative of the audio content for the multi-group message from the audio input device 202 and formats the electrical signals into audio frames (or voice frames) that are appended to the configured multi-group message header to create the multi-group message. In an exemplary embodiment, the control module 210 embeds or otherwise inserts the configuration information for the multi-group communication session (e.g., the multi-group link control opcode and target radio groups) within the audio frames, either as a header portion of each respective audio frame or at regular intervals of audio frames (e.g., every n number of audio frames), such that the configuration information for the multi-group communication session is interspersed throughout the multi-group message, as described in greater detail below. In an exemplary embodiment, at the end of the audio content (e.g., after the user of the initiating radio device 120, 200 releases or otherwise deactivates the input device 206 used to indicate the desire to provide audio content), the control module 210 of the initiating radio device 120, 200 appends a terminator field to the end of the audio frames of the multi-group message to identify the end of the multi-group message to the repeater 108 and/or other radio devices 110 in the communications system 100.

As described above, the control module 210 of the initiating radio device 120, 200 provides the multi-group message to the transmitter arrangement 214, which transmits RF signals representative of the multi-group message at the transmit frequency, wherein the repeater 108 receives the multi-group message at the transmit frequency and retransmits or rebroadcasts the multi-group message at the receive frequency. Each radio device 110 within the broadcast range of the repeater 108 receives the multi-group message, decodes, analyzes, or otherwise processes the header portion of the received message to identify the message type and target radio groups, and handles the received message in the appropriate manner based on the identified message type and target radio groups. As described in greater detail below in the context of FIG. 4, each respective radio device 110 of a target radio group 102, 104, 106 receives the multi-group message from the repeater 108, decodes the message header, and in response to identifying the message as a multi-group message and determining that its respective radio group 102, 104, 106 is a target radio group included for participation in the multi-group message, provides the audio content of the multi-group message to its user via its audio output device 204. Additionally, if a radio device 110 of a target radio group 102, 104, 106 does not receive the message header or the initial portion of the multi-group message, when that radio device 110 subsequently receives the configuration information for the multi-group message that is embedded in the audio frames, it decodes the configuration information, and in response to identifying a multi-group message and determining that its respective radio group 102, 104, 106 is a target radio group included for participation in the multi-group message, begins providing the audio content of the multi-group message to its user via its audio output device 204. In this manner, radio devices in the target radio groups may subsequently join the multi-group communication session at any time and are not precluded from participation if the initial message header is not received due to a radio device being powered off, out of range, over-the-air interference, or the like.

Figure 4:
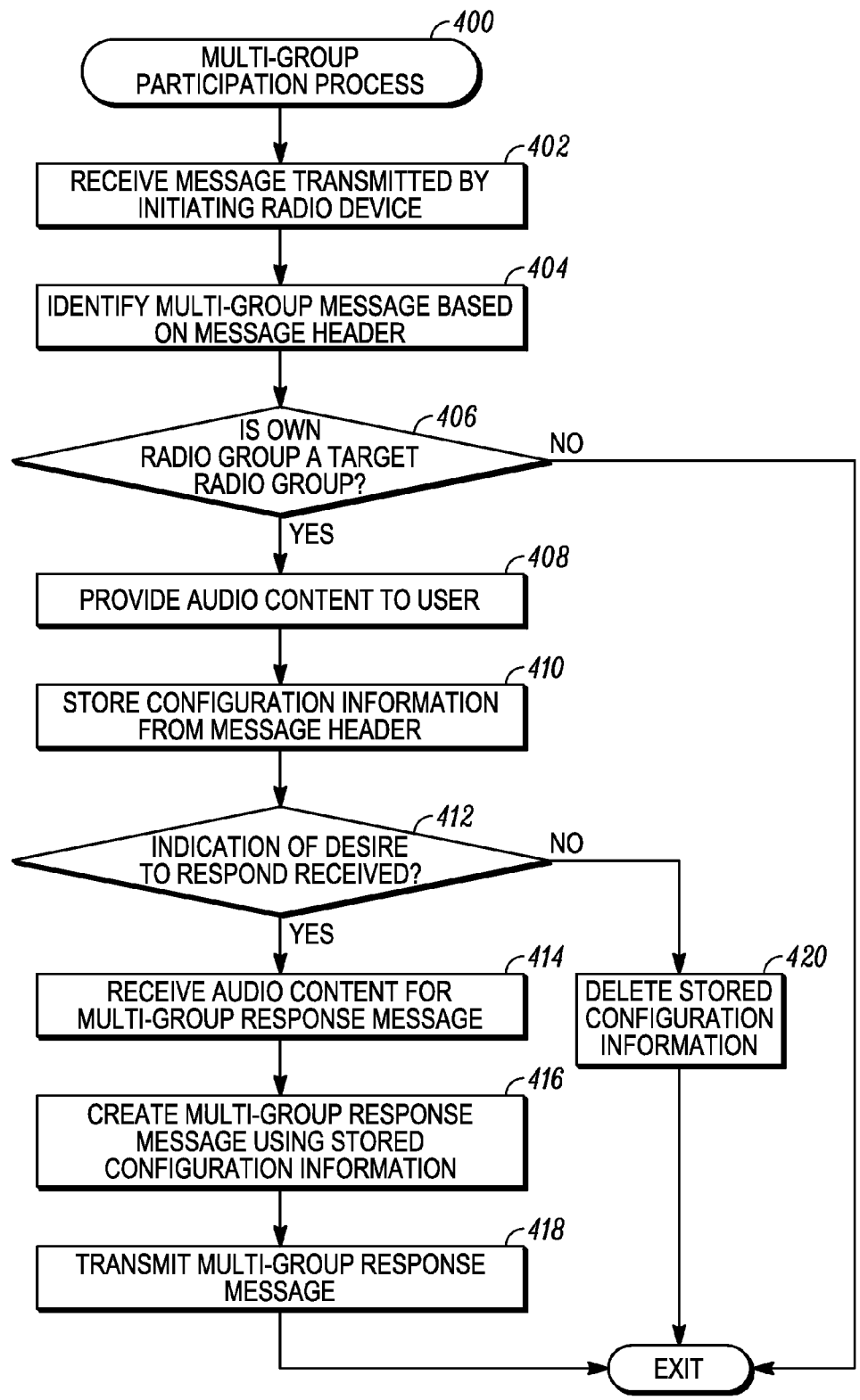
FIG. 4 is a flow diagram of a multi-group participation process suitable for use with the communications system of FIG. 1 in accordance with one embodiment.

Referring now to FIG. 4, in an exemplary embodiment, a radio device in a communications system is configured to perform a multi-group participation process 400 and additional tasks, functions, and operations described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the radio devices 110, 200, the control module 210, the audio output device 204, and/or the receiver arrangement 216. It should be appreciated that the multi-group participation process 400 may include any number of additional or alternative tasks, the tasks need not be performed in the illustrated order and/or the tasks may be performed concurrently, and/or the multi-group participation process 400 may be incorporated into a more comprehensive procedure or process having additional functionality not described in detail herein. Moreover, one or more of the tasks shown and described in the context of FIG. 4 could be omitted from an embodiment of the respective process as long as the intended overall functionality remains intact.

Referring to FIG. 4, and with continued reference to FIG. 1 and FIG. 2, the multi-group participation process 400 begins by receiving a message transmitted from an initiating radio device and identifying the message type as a multi-group message based on the message header (tasks 402, 404). In this regard, each radio device 110 in the communications system 100 within range of the repeater 108 receives the message transmitted by the initiating radio device 120 and decodes the message header to identify or otherwise determine whether the message is a multi-group message. In response to identifying the received message as a multi-group message, the multi-group participation process 400 continues by determining or otherwise identifying whether one's own radio group is a target radio group for the multi-group message (task 406). In this regard, each radio device 110 decodes the target group identifier field of the multi-group message to determine whether its own radio group identifier is included in the target group identifier field. In response to identifying that one's own radio group is a target radio group for the multi-group message, the multi-group participation process 400 continues by providing the audio content of the multi-group message to a user via the audio output device (task 408), as described in greater detail below. If the multi-group participation process 400 fails to identify a radio device's own radio group identifier in the message header, the multi-group participation process 400 exits. In this regard, when one's own radio group is not a target radio group, the respective radio device essentially ignores the multi-group message, for example, by failing to provide the audio content of the multi-group message to its audio output device or otherwise maintaining its audio output device muted.

Referring to FIGS. 1-4, in an exemplary embodiment using the DMR standard discussed above, the control module 210 of a receiving radio device 140 in the second radio group 104 may receive a message transmitted by the repeater 108 at the receive frequency via receiver arrangement 216 and decode or otherwise analyze its link control field and/or manufacturer identifier field to determine the message type for the received message. After determining or otherwise identifying the message type of the received message as a multi-group message based on the link control field and/or manufacturer identifier field, the control module 210 of the receiving radio device 140 continues by determining or otherwise identifying whether its own radio group 104 is a target radio group of the multi-group message. In this regard, the control module 210 of the receiving radio device 140 determines or otherwise identifies the size of the partitions for the target group identifier field of the multi-group message, obtains, from memory 212, the group identifier of the radio group 104 having a length equal to the partition size, and determines whether any partition of the target group identifier field matches the obtained group identifier for the radio group 104. When the 24-bit target group identifier field is partitioned into three 8-bit portions, the control module 210 of the receiving device 140 obtains the 8-bit group ID for the radio group 104 from memory 212 and determines whether an 8-bit partition of the target group identifier field matches the 8-bit group ID for the radio group 104. As described above, in some embodiments, the link control field and/or manufacturer identifier field may identify the number of target radio groups and/or the partition size for the target group identifier field, and in such embodiments, the control module 210 determines the partition size of the target group identifier field based on the link control field and/or manufacturer identifier field. In other embodiments, the partition size for the communications system 100 may be fixed, wherein the control module 210 and/or memory 212 is programmed for the fixed partition size. For example, based on the number of radio groups in the communications system, an administrator of the system may limit or otherwise constrain the number of target groups to a particular number by setting a fixed partition size for the target group identifier field of the multi-group message (e.g., setting a fixed partition size of 6-bits to limit multi-group messages to no more than 4 target radio groups). When an 8-bit partition of the target group identifier field matches the 8-bit group ID for the radio group 104, the control module 210 of the receiving device 140 determines or otherwise identifies its own radio group 104 as a target radio group for the multi-group message, and in response, provides the audio content of the multi-group message to its audio output device 204. In this regard, the control module 210 may convert the content portion of the multi-group message (e.g., the audio frames) into electrical signals representative thereof, and provide the electrical signals to the audio output device 204, which, in turn, generates or otherwise produces an auditory output corresponding to the audio frames of the multi-group message. In a similar manner, another radio device 160 of the third radio group 106 receives the message transmitted by the repeater 108, decodes its link control field and/or manufacturer identifier field to determine the message type for the received message, and after identifying the message type of the received message as a multi-group message, determines the third radio group 106 is a target radio group and provides the audio content of the multi-group message to the user in the third radio group 106 via its audio output device 204.

In an exemplary embodiment, in response to identifying that one's own radio group is a target radio group for the multi-group message, the multi-group participation process 400 stores or otherwise maintains the configuration information from the message header and to enable responding to the multi-group message within the same multi-group communication session (task 410). For example, the control module 210 of a receiving device 140, 160 may store or otherwise maintain the target group identifier field along with the link control field and/or manufacturer identifier field of the message header for the multi-group message in memory 212.

Referring again to FIG. 4, and with continued reference to FIGS. 1-3, in an exemplary embodiment, the multi-group participation process 400 continues by determining whether or not an indication of a desire to respond to the multi-group message has been received (task 412). For example, after hearing the audio content of the multi-group message, a user of the receiving radio device 140 in the second radio group 104 may desire to communicate a response to the multi-group message among the other recipients of the multi-group message within the same multi-group communication session. As described above, the initiating radio device 120 may append a termination frame to the end of the multi-group message to indicate there are no additional audio frames, wherein in response to receiving the termination frame, the control module 210 of the receiving radio device 140 indicates the end of the audio content in a conventional manner (e.g., by providing an auditory cue via audio output device 204). A user of the receiving radio device 140 may then manipulate an input device 206 to indicate a desire to respond to the multi-group message. In response to receiving indication of the desire to respond to the multi-group message, the multi-group participation process 400 continues by receiving audio content for the multi-group response message, creating the multi-group response message using the stored configuration information for the multi-group communication session, and transmitting the multi-group response message over-the-air (tasks 414, 416, 418). In this regard, the control module 210 of the responding radio device 140 receives electrical signals representative of the audio content provided by the user via audio input device 202 and converts or otherwise formats them into audio frames for the multi-group response message, in a similar manner as described above. The control module 210 obtains, from memory 212, the stored configuration information from the previously received multi-group message and creates a message header for the multi-group response message by reusing the stored configuration information from the previously received multi-group message. In this regard, the target group identifier field and the link control field and/or manufacturer identifier field of the message header of the multi-group response message are identical to those fields of the message header of the initial multi-group message, thereby ensuring the same radio groups will receive the audio content of the multi-group response message.

As described above, the control module 210 of the responding device 140 appends the audio frames to the message header, appends a termination frame to the end of the audio frames, and provides the multi-group response message to the transmitter arrangement 214 for over-the-air transmission at the transmit frequency, as described above in the context of FIG. 3. In this regard, the repeater 108 receives the multi-group response message at the transmit frequency and retransmits or rebroadcasts the multi-group response message at the receive frequency. The initiating radio device 120 receives the multi-group response message, decodes, analyzes, or otherwise processes the link control field and/or manufacturer identifier field to identify the message type of the multi-group response message as a multi-group message, then decodes, analyzes, or otherwise processes the target group identifier field of the multi-group response message to determine whether radio group 102 is a target radio group for the multi-group response message (e.g., tasks 402, 404, 406). In response to determining radio group 102 is a target radio group of the multi-group response message, the radio device 120, provides the audio content of the multi-group response message to its user via its audio output device 204 (e.g., task 408). Likewise, the radio device 160 in the third radio group 106 receives the multi-group response message, identifies the message type of the multi-group response message as a multi-group message, determines its own radio group 106 is a target radio group for the multi-group response message, and provides the audio content of the multi-group response message to its user (e.g., tasks 402, 404, 406, 408). One of the other radio devices 120, 160 participating in the multi-group communication session may subsequently respond to the multi-group response message from radio device 140 by repeating tasks 410, 412, 414, 416, 418, as described above. It will be appreciated that any number of additional multi-group responses may be communicated within the same multi-group communication session, until no users of radio devices 110 participating in the multi-group communication session desire to respond. In this regard, the repeater 108 may be configured to reserve communication channels within the communications system 100 for a period of time to provide sufficient opportunity for the radio devices 110 to respond to a previous multi-group message within the same communication session.

Referring again to FIG. 4, in the absence of a desire to respond to the multi-group message, in an exemplary embodiment, the multi-group participation process 400 deletes the stored configuration information for the multi-group communication session and exits (task 420). It should be noted that even if the stored configuration information is deleted, the radio device will still receive subsequent multi-group messages within the multi-group communication session because any responding radio devices will use the same configuration information in the message headers of any subsequent multi-group response messages.

As described above, it should be noted that the multi-group participation process 400 is not limited to the message header, and may be performed in an equivalent manner to a radio device of a target radio group to participate in the multi-group communication session even if that radio device does not receive the initial message header. For example, radio device 160 of a target radio group 106 may be out of range of the repeater 108 or otherwise fail to receive messages broadcast by the repeater 108 when the message header is transmitted by the repeater 108. However, once the radio device 160 returns to being within range of the repeater 108, the radio device 160 automatically begins receiving messages (or portions thereof) being transmitted by the repeater 108. The radio device 160 monitors and decodes the received portion of a message to determine when to provide auditory output. In response to identifying the message type as a multi-group message based on the configuration information interspersed or otherwise embedded within the message as described above, the radio device 160 determines or otherwise identifies whether its radio group 106 is a target radio group for the multi-group message (e.g., tasks 402, 404, 406). In response to determining radio group 106 is a target radio group of the multi-group response message, the radio device 160, beings providing the audio content of the multi-group response message to its user via its audio output device 204 (e.g., task 408). In this manner, the multi-group participation process 400 in conjunction with multi-group communication process 300 accommodates "late entry" and enables radio devices in target radio groups to participate in the multi-group communication session and receive at least a portion of the audio content even when the initial message header is not received.

To briefly summarize, one advantage of the devices and methods described above is that an initiating radio device in a first radio group may communicate a message to radio devices in different radio groups concurrently without relying on a centralized controller or a specialized setup procedure, thereby allowing the message to be communicated in a more expedient manner. As described above, the initiating radio device utilizes the header portion of the message to identify or otherwise designate the target radio groups for the message along with the type of message. Based on the type of message, the other radio devices decode the header portion, and in response to identifying one's own radio group as a target radio group for the message, a respective radio device produces or otherwise generates audio output corresponding to the audio content of the message. It should be noted that although the subject matter is described herein in the context of audio content, the techniques described herein may also be utilized for any type of data content communicated among multiple groups (e.g., multi-group text messages).

Another advantage of the above-described communication techniques is that a radio device in one of the target radio groups may miss an initial multi-group message (e.g., due to interference or being out of range), but still receive subsequent response messages by virtue of the message header identifying its radio group as a target radio group. Furthermore, as described above, the configuration information for the multi-group communication session is also interspersed or otherwise embedded in the multi-group messages, such that a radio device in one of the target radio groups may miss the message header of the initial multi-group message or a subsequent multi-group message, but still receive a portion of the audio content of that multi-group message subsequent response messages by virtue of the configuration information identifying its radio group as a target radio group inserted between audio frames. Thus, the above-described communications techniques also increase the reliability of the multi-group communications session (e.g., by increasing the percentage of users receiving the content of the message or otherwise improving likelihood that the content of a message is received by all users of radio devices of the target radio groups within range) by accommodating the "late entry" scenario, as opposed to existing techniques where a radio device that does not participate in the setup procedure does not participate in the multi-group communication session. Yet another advantage of the above-described communication techniques is that the header portion of a message may be configured for multi-group communications without increasing the size (or length) of the header portion by using existing fields to designate the message as a multi-group message and identify the target radio groups, such that extra bandwidth is not required.

For the sake of brevity, conventional techniques related to signal processing, data transmission, two-way radios and/or two-way radio systems, audio encoding and/or decoding, and other functional aspects of the systems (and the individual operating components of the systems) may not be described in detail herein. Furthermore, the subject matter may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of network architectures, data transmission protocols, and device configurations, and that the system described herein is merely one suitable example.

Those of skill in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for communicating a message to a plurality of radio groups, each radio group having one or more radio devices associated therewith, the method comprising:
   configuring a header portion of the message for a multi-group communication session including the plurality of radio groups; and
   transmitting the message, wherein a respective radio device of each respective radio group of the plurality of radio groups is configured to provide output corresponding to a content portion of the message based on the header portion;
   wherein configuring the header portion comprises formatting the header portion to identify the plurality of radio groups, the respective radio device of each respective radio group providing the output corresponding to the content portion of the message in response to identifying its respective radio group in the header portion of the message;
   wherein formatting the header portion comprises:
   partitioning a target group identifier field of the header portion into a number of partitions having a partition size; and
   for each respective radio group of the plurality of radio groups:
      obtain a respective group identifier having a length equal to the partition size; and
      utilizing the respective group identifier for a respective partition of the number of partitions.

2. The method of claim 1, wherein configuring the header portion further comprises configuring, by the first radio device, the header portion to identify a third radio group of the plurality of radio groups, a third radio device of the third radio group being configured to provide the output in response to identifying the third radio group in the header portion.

3. The method of claim 1, wherein:
   configuring the header portion comprises formatting the header portion with configuration information identifying the plurality of radio groups;
   transmitting the message further comprises inserting the configuration information within the content portion of the message; and
   a respective radio device of a respective radio group of the plurality of radio groups is configured to provide output corresponding to at least some of the content portion based on the configuration information interspersed therein.

4. The method of claim 1, further comprising determining the partition size as a fraction of a length of the target group identifier field based on a number of radio groups in the plurality of radio groups.

5. The method of claim 1, further comprising configuring the header portion to identify the message as a multi-group message prior to transmitting the message, wherein the respective radio device of each respective radio group is configured to:
   identify the message as a multi-group message based on the header portion; and
   after identifying the message as a multi-group message:
      determine whether the header portion of the message identifies its respective radio group as a target radio group; and
      provide the output corresponding to the content portion of the message in response to determining its respective radio group is a target radio group.

6. The method of claim 1, wherein configuring the header portion comprises configuring, by a first radio device of a first radio group, the header portion to identify a second radio group of the plurality of radio groups, a second radio device of the second radio group being configured to provide the output in response to identifying the second radio group in the header portion.

7. A method for communicating a message from a first radio device, the method comprising:
   configuring, by the first radio device, a target group identifier field of the message to identify a first radio group and a second radio group;
   transmitting the message by the first radio device;
   receiving the message by a second radio device associated with the first radio group; and
   providing, by the second radio device, auditory output corresponding to a content portion of the message based on the target group identifier field;
   storing, by the second radio device, the target group identifier field of the message, resulting in a stored target group identifier field;
   utilizing the stored target group identifier field as a target group identifier field of a second message; and
   transmitting the second message by the second radio device.

8. The method of claim 7, further comprising:
   receiving the message by a third radio device associated with the second radio group; and
   providing, by the third radio device, the auditory output corresponding to the content portion based on the target group identifier field.

9. The method of claim 7, further comprising:
   receiving the second message by a third radio device associated with the second radio group; and
   providing, by the third radio device, auditory output corresponding to a content portion of the second message in response to determining the target group identifier field of the second message includes the second radio group.

10. The method of claim 7, further comprising:
    configuring, by the first radio device, a control field of the message to identify the message as a multi-group message;
    identifying, by the second radio device, the message as a multi-group message based on the control field; and
    after identifying the message as a multi-group message, determining, by the second radio device, whether the target group identifier field identifies the first radio group, the second radio device providing the auditory output in response to determining the target group identifier field includes the first radio group.

11. The method of claim 10, further comprising:
receiving the message by a third radio device associated with the second radio group;
identifying, by the third radio device, the message as a multi-group message based on the control field; and
after identifying the message as a multi-group message:
   determining, by the third radio device, whether the target group identifier field identifies the second radio group; and
   providing, by the third radio device, the auditory output in response to determining the target group identifier field includes the second radio group.

12. A device comprising:
an audio input device to receive audio content for a first multi-group message;
a transmitter arrangement to transmit the first multi-group message; and
a control module coupled to the audio input device and the transmitter arrangement, the control module configuring a message header to identify a plurality of target groups and appending the audio content to the message header to create the first multi-group message;
a memory to maintain a plurality of group identifiers corresponding to a plurality of groups, wherein the control module configures the message header to identify the plurality of target groups by:
obtaining a respective group identifier for each respective target group of the plurality of target groups from the memory, resulting in a plurality of obtained group identifiers; and
concatenating the plurality of obtained group identifiers to obtain a target group identifier field of the message header.

13. The device of claim 12, the target group identifier field having a length, the control module dividing the length by a number of groups in the plurality of target groups to obtain a partition size, wherein a length of each respective obtained group identifier is equal to the partition size.

14. The device of claim 12, wherein the control module configures a control field of the message header to identify the first multi-group message as a multi-group message.

15. The device of claim 12, further comprising
an audio output device; and
a receiver arrangement to receive a second multi-group message, the control module being coupled to the audio output device and the receiver arrangement, wherein:
   in response to identifying a first group as a target group of the second multi-group message based on a header portion of the second multi-group message, the control module provides a content portion of the second multi-group message to the audio output device, the audio output device producing auditory output corresponding to the content portion; and
   the device is associated with the first group.

16. The device of claim 15, the control module identifying the second multi-group message as a multi-group message based on a control field of the header portion of the second multi-group message, wherein the control module determines whether the first group is a target group of the second multi-group message after identifying the second multi-group message as a multi-group message.

17. The device of claim 12, further comprising an input device for receiving indication of the plurality of target groups, the control module configuring the message header in response to receiving the indication of the plurality of target groups.

* * * * *